April 2, 1963 L. A. HARVEY 3,083,450
PORTABLE COOKING APPLIANCE
Filed Dec. 10, 1959
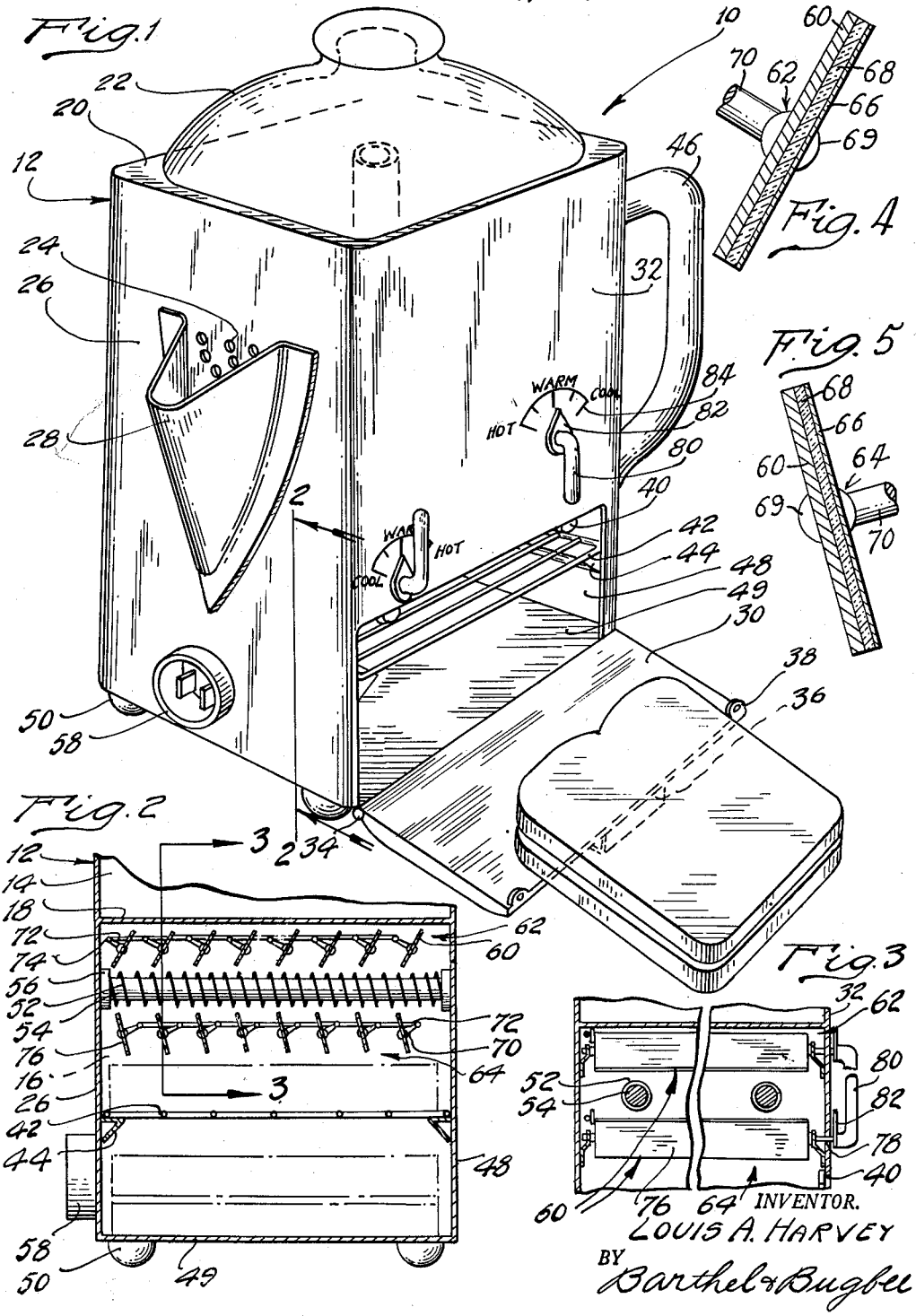
INVENTOR.
LOUIS A. HARVEY
BY Barthel & Bugbee
ATTORNEYS United States Patent Office 3,083,450
Patented Apr. 2, 1963

3,083,450
PORTABLE COOKING APPLIANCE
Louis A. Harvey, 12977 Riopelle, Detroit 3, Mich.
Filed Dec. 10, 1959, Ser. No. 858,680
4 Claims. (Cl. 99—288)

This invention relates to electrical appliances and, in particular, to electrical appliances for food preparation.

One object of this invention is to provide a portable combined liquid heating and solid food cooking appliance having two components which are capable of being heated singly or simultaneously from a common electrical heating element and disposed between them, the one component being adapted to heat liquids such as ingredients of beverages like coffee, tea, chocolate or soup, and the other component being adapted to cook solid foods in small quantities as by warming, toasting or baking them, means being provided for regulating or proportioning the amount and quality of heat delivered to each component from the common heating element according to the function being performed by each component, such as baking, toasting, warming or boiling, and also according to the ratio of direct to indirect exposure to the heat source required by the particular heating or cooking operations being performed.

Another object is to provide a portable combined heating and solid food cooking appliance as set forth in the foregoing object wherein the appliance is of such compact form as to be capable to being held in one hand in order to pour a heated beverage or other liquid therefrom, regardless of whether or not either or both components of the appliance are in use at that particular time.

Another object is to provide a portable combined liquid heating and solid food cooking appliance as set forth in the foregoing objects, which appliance is simple and inexpensive to manufacture and which will perform light heating or cooking tasks and thereby dispensing with the need for larger single appliances.

Other objects and advantages of the invention will become apparent during the course of the following description of the accompanying drawings, wherein:

FIGURE 1 is a perspective view of a portable combined food cooker and beverage heating device, according to one form of the invention;

FIGURE 2 is a fragmentary vertical section taken along the line 2—2 in FIGURE 1;

FIGURE 3 is a fragmentary vertical section of the heat source and the apparatus for regulating heat transmission, and is taken along the line 3—3 in FIGURE 2;

FIGURE 4 is an enlarged fragmentary cross-section through one of the louvers of the upper louver set shown in FIGURE 2; and FIGURE 5 is an enlarged fragmentary cross-section through one of the louvers of the lower louver set shown in FIGURE 2.

Referring to the drawings in detail, FIGURE 1 shows a portable combined food cooker and beverage heating appliance, generally designated 10, having a casing, generally designated 12. As shown in FIGURE 2, the casing 12 has an upper compartment 14 and a lower compartment 16 separated by a horizontal floor panel 18. The top of the casing 12 consists of a rim 20 (FIGURE 1) upon which is mounted a removable transparent lid 22 which, when removed, provides access to the upper compartment 14. The upper compartment 14 preferably contains conventional beverage-making equipment (not shown), the construction and operation of which are well beyond the scope of the present invention and are well known to those skilled in the beverage-making art. Such equipment may consist, for example, of conventional devices for making so-called "drip" or "percolated" coffee. Perforations 24 are provided toward the top of a side wall 26 of the casing 12 for the outward flow of the heated beverage from the compartment 14, the flow being directed by a spout 28 projecting from the wall 26 beside and beneath the perforations 24. Excepting the perforations 24, the upper compartment 14 is water-tight when the removable lid 22 is fitted in place.

Access to the lower compartment 16 is provided by a door 30 opening from a side wall 32 of the casing 12 adjacent the side wall 26. The door 30 has supporting hinges 34 upon its bottom edge, pivotally fastening the door 30 to the side wall 32. The door 30 also has a handle 36 and latches 38 upon its top edge, the latches 38 being engageable with the side wall 32 immediately above the door opening. Stops 40 project downward from the inside surface of the side wall 32 into the door opening to restrict the travel of the door 30. The lower compartment 16 has a removable wire grille tray 42 mounted upon supports 44 which place the tray 42 in a position intermediate the top and bottom of the opening of the door 30. A handle 46 is provided upon the side wall 48 which is located opposite the side wall 26 containing the spout 28. The bottom wall 49 of the casing 12 is spaced away from the table or other supporting surface (not shown) by four hemispherical feet 50 projecting from the bottom of the casing 12.

The heat source for the compartments 14 and 16 consists of a series of high-resistance electric wire coils 52 (FIGURE 2), each of which is wrapped around an insulated supporting rod 54. The rods 54 span the upper part of the lower chamber 16 between the side walls 26 and 48 and have each end supported by a bracket 56. The heating coils 52 are connected to a conventional double-pronged male electric socket 58 which has been located upon the wall 26 in FIGURE 1 for purposes of this illustration, but which may be located in any suitable and convenient position.

Adjustable elongated rectangular louvers, generally designated 60, are provided in the upper part of the lower compartment 16 and disposed in two sets, an upper shutter set or damper, generally designated 62 located between the heating coils 52 and horizontal floor panel 18, and a lower shutter set or damper, generally designated 64, located directly below the heating coils 52. Each louver 60 (FIGURES 4 and 5) has highly-reflective surface coating 66 covering a layer of heat-insulating material 68 of low thermal conductivity. Each louver 60 is pivoted at both ends upon trunnions 69 its longitudinal central axis. A connecting arm 70 on one of the trunnions 69 projects from one end of each louver 60, lying within a plane perpendicular to the plane of the louver 60. Each louver set 62 and 64 has a link member 72 which is pivotally connected to a pin 74 upon each arm 70. One master louver 76 in each louver set 62 and 64 has a control rod 78 forming an extension of one of the trunnions 69 on the longitudinal central axis of the master louver 70 and projecting through the side wall 24, terminating in a bent-up control lever portion 80. A pointer 82 is mounted upon the control rod 78 adjacent the outer surface of the casing wall 32, together with a corresponding calibrated dial 84 upon the wall 32 whereby to indicate the adjusted pitch of the louvers 60 which are connected within the casing 12.

In the operation of the combined liquid heating and solid food cooking appliance 10, the adjustable louvers 60 act to control the proportion of direct and indirect heat distributed to the upper compartment 14 and lower compartment 16, according to the operation being peformed in one or both of the compartments. The louvers 60 in each of the independent louver sets 62, 64 are adjusted simultaneously to a range of positions from horizontal to vertical. In a horizontal position, the louvers 60 of each louver set 62, 64 resemble a plane surface forming a barrier to transmission of direct heat. In a vertical position, the louvers provide the maximum possible transmission of direct heat.

When the upper compartment is in use for making coffee or other heated beverages the louvers 60 of the upper vane set 62 are set in their vertical position so that the coil 52 will apply heat directly to the floor panel 18 which will heat the compartment 14 and its contents. At times when only the lower compartment 16 is in use, the louvers 60 of the upper vane set 62 are turned to their horizontal position so that the direct heat of the coils 52 is reflected back downward by the reflective surface of the louvers 60. When direct heat from the coils 52 is required in the lower compartment, for example in toasting bread, the louvers 60 of the lower louver set 64 are turned to their vertical position. In baking or other operations requiring only indirect or a controlled amount of direct heat in the lower compartment, the louvers 60 of the lower louver set 64 are adjusted to their horizontal position or in the range of positions between horizontal and vertical.

Articles to be treated in the lower compartment 16 are placed upon the wire tray 42 or upon the floor of the compartment 16 when the tray 42 is removed. While an article is being treated upon the wire tray 42, other articles are kept warm if they are placed in the space beneath the tray 42. When direct heat is applied to an article upon the tray 42, as in toasting, the article must be turned over during the process if both sides are to be treated. In this process, however, a spread such as butter or cheese may be applied to the untreated side before further heating of the article.

What I claim is:

1. A portable combined liquid heating and solid food cooking appliance, comprising
    a generally vertical casing having a liquid-heating compartment in the upper portion thereof,
    a solid food cooking compartment in the lower portion thereof disposed in vertically-spaced relationship with said liquid heating compartment,
    a single electrical heating unit disposed in said casing in the space between said liquid heating and solid food cooking compartments,
    an upper set of multiple shutters pivotally mounted in said casing above said heating unit between said heating unit and said liquid heating compartment and selectively movable between closed and open positions,
    a lower set of multiple shutters pivotally mounted in said casing below said heating unit between said heating unit and said solid food cooking compartment and selectively movable between closed and open positions,
    means for selectively moving said upper set of shutters between the closed and open positions of said upper shutters,
    and means for selectively moving said lower set of shutters between the closed and open positions of said lower shutters.

2. A portable combined liquid heating and solid food cooking appliance, according to claim 1, wherein said multiple shutters are arranged in sets, wherein said means includes a motion-transmitting element operatively interconnecting the shutters of each set, and wherein said means also includes an adjusting member operatively connected to each motion-transmitting element.

3. A portable combined liquid heating and solid food cooking appliance, according to claim 1, wherein said shutters have heat insulating material therein.

4. A portable combined liquid heating and solid food cooking appliance, according to claim 3, wherein said dampers have heat-reflecting coatings disposed on said heat insulating material.

References Cited in the file of this patent

UNITED STATES PATENTS

| | | |
|---|---|---|
| 1,266,308 | Peck et al. | May 14, 1918 |
| 1,587,023 | Mottlau | June 1, 1926 |
| 1,745,534 | Grayson | Feb. 4, 1930 |
| 1,862,733 | Wright | June 14, 1932 |
| 2,413,447 | Greene | Dec. 31, 1946 |
| 2,578,034 | Baltzell | Dec. 11, 1951 |
| 2,862,441 | Schmall | Dec. 2, 1958 |
| 2,949,525 | Dunn | Aug. 16, 1960 |